(12) United States Patent
Ootani et al.

(10) Patent No.: US 9,759,449 B2
(45) Date of Patent: Sep. 12, 2017

(54) FEED WATER HEATING SYSTEM

(71) Applicant: MIURA CO., LTD., Ehime (JP)

(72) Inventors: Kazuyuki Ootani, Ehime (JP);
Yasukuni Tanaka, Ehime (JP);
Masanori Takemoto, Ehime (JP);
Rikki Sugiura, Ehime (JP); Tomoya Oozawa, Ehime (JP)

(73) Assignee: MIURA CO., LTD., Ehime (JP)

( * ) Notice: Subject to any disclaimer, the term of this patent is extended or adjusted under 35 U.S.C. 154(b) by 386 days.

(21) Appl. No.: 14/387,522

(22) PCT Filed: Nov. 6, 2012

(86) PCT No.: PCT/JP2012/078728
§ 371 (c)(1),
(2) Date: Sep. 23, 2014

(87) PCT Pub. No.: WO2013/145406
PCT Pub. Date: Oct. 3, 2013

(65) Prior Publication Data
US 2015/0059379 A1 Mar. 5, 2015

(30) Foreign Application Priority Data

Mar. 30, 2012 (JP) .................................. 2012-079191

(51) Int. Cl.
*F24H 9/20* (2006.01)
*F25B 29/00* (2006.01)
*F24D 17/02* (2006.01)
*F24D 19/10* (2006.01)
*F24H 1/18* (2006.01)
*F25B 30/02* (2006.01)
*F25B 49/02* (2006.01)
*F25B 25/00* (2006.01)
*F25B 40/02* (2006.01)

(52) U.S. Cl.
CPC ........... *F24H 9/2007* (2013.01); *F24D 17/02* (2013.01); *F24D 19/1054* (2013.01); *F24H 1/18* (2013.01);
(Continued)

(58) Field of Classification Search
None
See application file for complete search history.

(56) References Cited

U.S. PATENT DOCUMENTS 4,201,058 A * 5/1980 Vaughan ................. F01K 23/14
60/618
4,364,239 A * 12/1982 Chapelle ............. F24D 11/0221
62/235.1
(Continued)

FOREIGN PATENT DOCUMENTS

CN 101208564 A 6/2008
CN 102313397 A 1/2012
(Continued)

*Primary Examiner* — Justin Jonaitis
*Assistant Examiner* — Kamran Tavakoldavani
(74) *Attorney, Agent, or Firm* — Muncy, Geissler, Olds & Lowe, P.C.

(57) ABSTRACT

Feedwater to be supplied to a feedwater tank via a feedwater path is passed through a waste heat recovery heat exchanger, a supercooler, and a condenser in sequence. A heat source fluid such as heat source water is passed through an evaporator and the waste heat recovery heat exchanger in sequence. The waste heat recovery heat exchanger is an indirect heat exchanger between the feedwater supplied to the feedwater tank via the feedwater path and the heat source fluid having passed through the evaporator. The supercooler is an indirect heat exchanger between the feedwater supplied to the feedwater tank via the feedwater path and a refrigerant supplied from the condenser to an expansion valve.

16 Claims, 1 Drawing Sheet

(52) U.S. Cl.
CPC .......... *F25B 25/005* (2013.01); *F25B 29/003* (2013.01); *F25B 30/02* (2013.01); *F25B 49/02* (2013.01); *F24D 2200/123* (2013.01); *F25B 40/02* (2013.01); *F25B 49/022* (2013.01); *F25B 2339/047* (2013.01); *F25B 2600/021* (2013.01); *F25B 2700/21172* (2013.01); *Y02B 30/741* (2013.01)

(56) References Cited

U.S. PATENT DOCUMENTS

| | | | | |
|---|---|---|---|---|
| 5,630,913 | A | * | 5/1997 | Tajer-Ardebili ....... B01D 3/007 159/901 |
| 2009/0113911 | A1 | | 5/2009 | Nakayama |
| 2011/0005245 | A1 | * | 1/2011 | Pussell ................ F24D 11/0214 62/89 |
| 2011/0056225 | A1 | * | 3/2011 | Campbell ........... F28D 15/0266 62/208 |
| 2011/0073666 | A1 | * | 3/2011 | Jang ......................... F24D 3/08 236/12.11 |

FOREIGN PATENT DOCUMENTS

| | | |
|---|---|---|
| CN | 202166232 U | 3/2012 |
| JP | 10-103770 | 4/1998 |
| JP | 2007-120914 | 5/2007 |
| JP | 2009-168348 | 7/2009 |
| JP | 2010-025431 | 2/2010 |
| JP | 2010-243012 | 10/2010 |

* cited by examiner

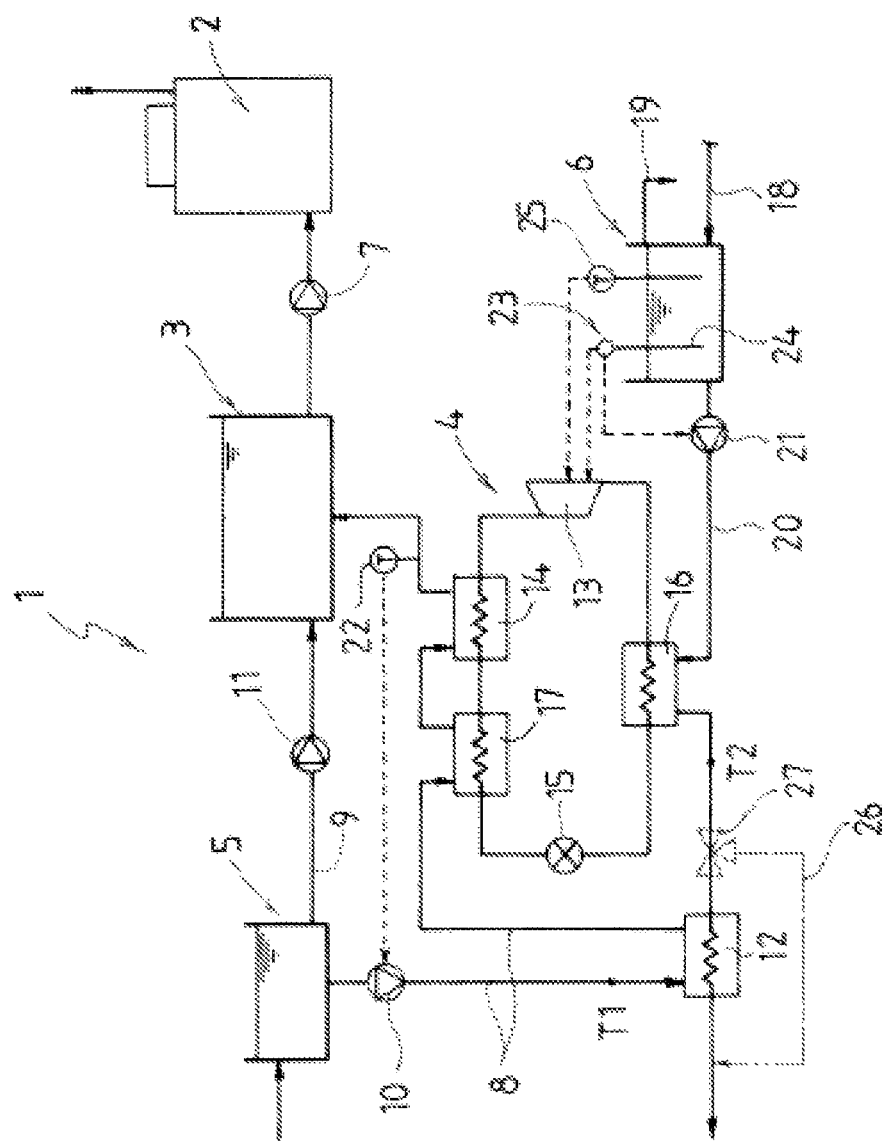

FEED WATER HEATING SYSTEM

TECHNICAL FIELD

The present invention relates to a feedwater heating system in which a heat pump is used. This application claims priority on Patent Application No. 2012-079191 filed in Japan on Mar. 30, 2012, the contents of which are hereby incorporated by reference.

BACKGROUND ART

Conventionally, as disclosed in Patent Literature 1, there has been known a system capable of heating, by means of a heat pump (12), feedwater supplied to a feedwater tank (23) of a boiler (24). Further, as disclosed in Patent Literature 2, there has been also known a system (S1) that generates steam by means of a heat pump (10). The system is separated into a heating unit (21 (a first heat exchanger 40)) that heats water to the temperature near the boiling point and an evaporating unit (22 (a second heat exchanger 41)) that evaporates water.

CITATIONS LIST

Patent Literatures

Patent Literature 1: JP 2010-25431 A (FIGS. 2 and 3)
Patent Literature 2: JP 2007-120914 A (FIG. 1, paragraphs 0024-0027, 0032)

SUMMARY OF THE INVENTION

Technical Problems

According to any of the inventions disclosed in the patent literatures noted above, even when heat that can still be used remains in a heat source fluid having passed through the evaporator of the heat pump, such heat cannot be used. Furthermore, when heating of feedwater is performed solely by the heat pump, the system increases in size and the power consumption of a compressor also increases. Thus, the efficiency of the heat pump (coefficient of performance: COP) is poor.

Further, according to any of the inventions disclosed in the patent literatures noted above, the flow rate of the water to be heated by the heat pump is constant. Therefore, the temperature of hot water from the heat pump (which corresponds to the temperature of water heated at the heating unit 21 in the invention disclosed in Patent Literature 2, because the evaporating unit 22 attains the saturation temperature under a predetermined pressure) cannot be desirably maintained corresponding to the temperature of water in the feedwater source or changes in the temperature of the heat source fluid that is passed through the evaporator of the heat pump.

Accordingly, an object of the present invention is to improve the efficiency of a heat pump in a feedwater heating system in which the heat pump is used. Another object of the present invention is to preferably maintain the temperature of the output hot water at a desired temperature.

Solutions to the Problems

The present invention has been made to solve the problems described above. An invention of claim 1 is a feedwater heating system including: a heat pump in which a compressor, a condenser, an expansion valve, and an evaporator are connected in sequence in an annular manner to allow a refrigerant to circulate, the heat pump drawing heat from a heat source fluid that is passed through the evaporator, the heat pump heating feedwater that is passed through the condenser; and a feedwater tank that can be supplied with the feedwater from a feedwater path through which the feedwater is passed through a waste heat recovery heat exchanger, a supercooler, and the condenser in sequence, wherein the waste heat recovery heat exchanger is an indirect heat exchanger between the feedwater supplied to the feedwater tank via the feedwater path and the heat source fluid having passed through the evaporator, and the supercooler is an indirect heat exchanger between the feedwater supplied to the feedwater tank via the feedwater path and the refrigerant supplied from the condenser to the expansion valve.

According to the invention of claim 1, the feedwater to be supplied to the feedwater tank is passed through the waste heat recovery heat exchanger, the supercooler and the condenser in sequence, whereas the heat source fluid of the heat pump is passed through the evaporator and the waste heat recovery heat exchanger in sequence. By preheating the feedwater supplied to the condenser using waste heat of the heat source fluid having passed through the evaporator and heat of the refrigerant having passed through the condenser, the efficiency of the heat pump can be improved.

An invention of claim 2 is the feedwater heating system according to claim 1, wherein, while the feedwater tank is supplied with the feedwater via the feedwater path, the heat pump is driven and an amount of the feedwater being passed through the condenser is adjusted such that a temperature of the feedwater on an exit side of the condenser of the heat pump is maintained at a set temperature.

According to the invention of claim 2, while the feedwater tank is supplied with the feedwater via the feedwater path, the amount of the feedwater being passed through the condenser (the flow rate of the feedwater supplied to the feedwater tank via the feedwater path) is adjusted such that the temperature of the feedwater on the exit side of the condenser is maintained at a set temperature. Thus, hot water of a desired temperature can be obtained irrespective of the temperature of the water in the feedwater source or the temperature of the heat source fluid. Further, in order to maintain the temperature of the feedwater on the exit side of the condenser at a set temperature, control is exerted on the amount of feedwater being passed through the condenser, and not on the heat pump. Thus, the heat pump can be driven highly efficiently with heavy load, or the load can be adjusted in accordance with the water level of the feedwater tank.

An invention of claim 3 is the feedwater heating system according to one of claims 1 and 2, wherein the condenser condenses the refrigerant of the heat pump, such that the feedwater to be supplied to the feedwater tank is heated by latent heat and sensible heat of the refrigerant of the heat pump, and the supercooler cools a liquid refrigerant from the condenser, such that the feedwater to be supplied to the feedwater tank is heated by the sensible heat of the refrigerant of the heat pump.

According to the invention of claim 3, the refrigerant of the heat pump is condensed from the vapor phase to the liquid phase by the condenser. The liquid refrigerant as a result of condensation is further cooled by the supercooler. Since separate heat exchangers are employed for condensing the refrigerant and for supercooling the refrigerant, designing of each heat exchanger becomes easier. Further, each heat exchanger can be reduced in size with a simplified structure, and a reduction in costs can be achieved. Still further, it becomes possible to employ general purpose heat exchangers.

An invention of claim 4 is the feedwater heating system according to any one of claims 1 to 3, wherein whether or not the heat source fluid having passed through the evaporator is passed through the waste heat recovery heat exchanger is switchable, and the heat source fluid having passed through the evaporator is not passed through the waste heat recovery heat exchanger when a temperature of the feedwater on an entrance side of the waste heat recovery heat exchanger is higher than a temperature of the heat source fluid on an exit side of the evaporator.

According to the invention of claim 4, in the event that the temperature of the feedwater on the entrance side of the waste heat recovery heat exchanger is higher than the temperature of the heat source fluid on the exit side of the evaporator, by not allowing the heat source fluid having passed through the evaporator to pass through the waste heat recovery heat exchanger, unintended cooling of the feedwater by the heat source fluid of a relatively low temperature can be avoided.

An invention of claim 5 is the feedwater heating system according to any one of claims 1 to 4, wherein an output of the heat pump is adjusted based on a temperature of the heat source fluid that is passed through the evaporator of the heat pump.

According to the invention of claim 5, by adjusting the output of the heat pump taking into consideration of the temperature of the heat source fluid, the flow rate of the feedwater supplied to the feedwater tank via the feedwater path can be stabilized irrespective of changes in the temperature of the heat source fluid.

An invention of claim 6 is the feedwater heating system according to any one of claims 1 to 5, wherein the heat pump is stopped from driving and supply of the heat source fluid to the evaporator is stopped when an amount of the heat source fluid that is passed through the evaporator of the heat pump becomes lower than a set value or when an amount of the feedwater that passes through the feedwater path becomes lower than a set value.

According to the invention of claim 6, when the amount of the heat source fluid in the heat pump becomes smaller than the intended amount or when the amount of the feedwater passing through the feedwater path becomes smaller than the intended amount, the heat pump can be stopped from driving.

Advantageous Effects of the Invention

According to the present invention, in a feedwater heating system in which a heat pump is used, the efficiency of the heat pump can be improved. Further, the temperature of the hot water can be desirably maintained in accordance with the embodiment.

BRIEF DESCRIPTION OF THE DRAWING

FIG. 1 is a schematic diagram showing an embodiment of a feedwater heating system of the present invention.

DESCRIPTION OF EMBODIMENT

In the following, a specific embodiment of the present invention will be described in detail with reference to the drawing.

FIG. 1 is a schematic diagram showing an embodiment of a feedwater heating system 1 of the present invention.

A feedwater heating system 1 according to the present embodiment is a system in which feedwater supplied to a feedwater tank 3 of a boiler 2 can be heated by a heat pump 4. The feedwater heating system 1 includes the feedwater tank 3 that stores feedwater supplied to the boiler 2, a makeup water tank 5 that stores feedwater supplied to the feedwater tank 3, the heat pump 4 that heats feedwater supplied from the makeup water tank 5 to the feedwater tank 3, a heat source water tank 6 that stores heat source water (e.g., waste hot water) as a heat source of the heat pump 4.

The boiler 2 is a steam boiler, which heats the feedwater supplied from the feedwater tank 3 to generate steam. Representatively, the combustion amount of the boiler 2 is adjusted such that the pressure of the steam is desirably maintained. Further, in connection with the boiler 2, a pump 7 provided on the feedwater path through which feedwater is supplied from the feedwater tank 3 to the boiler 2 or provided in the boiler 2 is controlled such that the water level of the boiler body is desirably maintained. The steam from the boiler 2 is sent to various steam-utilizing facilities (not shown). The drain (condensed water of the steam) from the steam-utilizing facilities may be fed back to the feedwater tank 3.

The feedwater tank 3 can be supplied with feedwater from the makeup water tank 5 through a feedwater path 8 via the heat pump 4, and also can be supplied with feedwater through a makeup water path 9 without involvement of the heat pump 4. Control exerted on the actuation of a feedwater pump 10 provided on the feedwater path 8 and that of a makeup water pump 11 provided on the makeup water path 9 allows water to be supplied from the makeup water tank 5 to the feedwater tank 3 via one of or both of the feedwater path 8 and the makeup water path 9. The feedwater path 8 is provided with a waste heat recovery heat exchanger 12 and the heat pump 4 downstream from the feedwater pump 10 in sequence.

In the present embodiment, the rotational speed of the feedwater pump 10 can be controlled by an inverter. By changing the rotational speed of the feedwater pump 10, the flow rate of the feedwater supplied to the feedwater tank 3 via the feedwater path 8 can be adjusted. On the other hand, in the present embodiment, the makeup water pump 11 is controlled to turn ON/OFF.

The makeup water tank 5 stores feedwater to be supplied to the feedwater tank 3. In the present embodiment, soft water is employed as the feedwater to be supplied to the makeup water tank 5. That is, soft water from which mineral contents have been removed by a water softener (not shown) is supplied to the makeup water tank 5 and stored therein. By controlling the feedwater supplied from the water softener based on the water level of the makeup water tank 5, the water level of the makeup water tank 5 can be desirably maintained.

The heat pump 4 is a vapor-compression heat pump, in which a compressor 13, a condenser 14, an expansion valve 15, and an evaporator 16 are successively connected in an annular manner. The compressor 13 compresses a gaseous refrigerant to raise the temperature and pressure of the refrigerant. The condenser 14 condenses and liquefies the gaseous refrigerant supplied from the compressor 13. The expansion valve 15 passes the liquid refrigerant supplied from the condenser 14, thereby reducing the pressure and temperature of the refrigerant. The evaporator 16 evaporates the refrigerant from the expansion valve 15.

Accordingly, in the heat pump 4, the evaporator 16 allows the refrigerant to absorb heat from the outside to evaporate, whereas the condenser 14 allows the refrigerant to dissipate heat to the outside to be condensed. With these functions, in the present embodiment, the heat pump 4 draws heat from heat source water as the heat source at the evaporator 16 and heats water in the feedwater path 8 at the condenser 14.

Note that, in the present embodiment, the heat exchange between the refrigerant of the heat pump 4 and the heat source water is performed by one heat exchanger structuring the evaporator 16, and no third fluid is involved with the heat exchange between the refrigerant of the heat pump 4 and the heat source water. Accordingly, the temperature difference between the refrigerant passing through the evaporator 16 of the heat pump 4 and the heat source water can be reduced. Thus, an improvement in the coefficient of performance (COP) of the heat pump 4 can be achieved. Furthermore, since the structure is simplified, a reduction in costs can also be achieved.

The heat pump 4 further includes a supercooler 17 between the condenser 14 and the expansion valve 15. The supercooler 17 is an indirect heat exchanger between the refrigerant supplied from the condenser 14 to the expansion valve 15 and the feedwater supplied to the condenser 14. The supercooler 17 can supercool the refrigerant supplied from the condenser 14 to the expansion valve 15 by the feedwater supplied to the condenser 14, and heat the feedwater supplied to the condenser 14 by the refrigerant supplied from the condenser 14 to the expansion valve 15. The refrigerant of the heat pump 4 releases latent heat at the condenser 14, and releases sensible heat at the supercooler 17.

That is, a gaseous refrigerant is condensed to become a liquid refrigerant at the condenser 14. The liquid refrigerant is supplied to the supercooler 17. At the supercooler 17, the liquid refrigerant is further cooled (supercooled). Since separate heat exchangers are employed for condensing the refrigerant and for supercooling the refrigerant, designing of each heat exchanger becomes easier. Further, each heat exchanger can be reduced in size with a simplified structure, and a reduction in costs can be achieved. Still further, it becomes possible to employ general purpose heat exchangers.

Further, in the heat pump 4, an accumulator may be installed on the entrance side of the compressor 13. Also, an oil separator may be installed on the exit side of the compressor 13, or a liquid receiver may be installed on the exit side of the condenser 14 (between the condenser 14 and the supercooler 17).

Meanwhile, the output of the heat pump 4 (the capacity of the compressor) may be variable. For example, by changing the rotational speed of the motor of the compressor 13 by an inverter, the output of the heat pump 4 can be changed.

The heat source water tank 6 stores heat source water as the heat source of the heat pump 4. The heat source water is, for example, waste hot water (hot water discharged from factories or the like). Note that, the heat source water tank 6 is provided with a supply path 18 of the heat source water, and an overflow path 19 for letting out excessive water.

The water in the heat source water tank 6 is passed through the evaporator 16 of the heat pump 4 via a heat source supply path 20. Thereafter, the water is passed through the waste heat recovery heat exchanger 12. In the heat source supply path 20, a heat source supply pump 21 is provided upstream from the evaporator 16. By actuating the heat source supply pump 21, the heat source water from the heat source water tank 6 can be passed through the evaporator 16 and the waste heat recovery heat exchanger 12 in sequence.

By allowing the heat source water to pass through the evaporator 16 and thereafter through the waste heat recovery heat exchanger 12, as compared to the case where the heat source water is allowed to pass through the waste heat recovery heat exchanger 12 and thereafter through the evaporator 16, the temperature at which the refrigerant at the evaporator 16 evaporates (i.e., the pressure at which the refrigerant evaporates) can be raised and the pressure ratio of the compressor 13 can be reduced. Thus, the energy can be saved.

Note that, the waste heat recovery heat exchanger 12 is an indirect heat exchanger between the feedwater supplied from the makeup water tank 5 to the supercooler 17 and the heat source water supplied from the evaporator 16. In the case of the present embodiment, as to the feedwater supplied from the makeup water tank 5 to the feedwater tank 3 via the feedwater path 8, the feedwater is output from the makeup water tank 5 to pass through the waste heat recovery heat exchanger 12, the supercooler 17, and the condenser 14 in sequence, and thereafter supplied to the feedwater tank 3.

The feedwater path 8 is provided with a water temperature sensor 22 on the exit side of the condenser 14. The water temperature sensor 22 detects the temperature of water having passed through the condenser 14. The feedwater pump 10 is controlled based on the temperature detected by the water temperature sensor 22. Herein, the feedwater pump 10 is controlled by an inverter so as to maintain the temperature detected by the water temperature sensor 22 to a set temperature T (e.g., 75° C.). That is, the flow rate of the feedwater to the feedwater tank 3 via the feedwater path 8 is adjusted such that the temperature detected by the water temperature sensor 22 is maintained at the set temperature T. Note that, in some cases, such flow rate adjusting control by means of the water temperature sensor 22 can be dispensed with.

The heat source water tank 6 is provided with a water level detector 23 for checking presence of the heat source water as the heat source of the heat pump 4. Though the structure of the water level detector 23 is not particularly limited, it is an electrode type water level detector in the present embodiment. That is, a low water level detecting electrode rod 24 is inserted into the heat source water tank 6 to monitor whether or not the water level of the heat source water is below the set level. Further, the heat source water tank 6 may be provided with a heat source temperature sensor 25 for detecting the temperature of the heat source water.

Next, a description will be given of control (the driving method) of the feedwater heating system 1 according to the present embodiment. The sequence of control steps described in the following is automatically exerted by means of a not-shown controller.

While the feedwater tank 3 can be supplied with feedwater via the feedwater path 8 or via the makeup water path 9, control is preferably exerted so as to assign high priority to the feedwater supplied via the feedwater path 8. For example, the feedwater supplied via the feedwater path 8 is controlled such that the water level of the feedwater tank 3 in the set range is maintained. However, in the case where the water level of the feedwater tank 3 becomes lower than the set range under such control, the feedwater supplied to the feedwater tank 3 is preferably performed also via the makeup water path 9.

While feedwater is supplied to the feedwater tank 3 via the feedwater path 8, the heat pump 4 is driven. In other words, the feedwater pump 10 and the heat pump 4 operate in association with each other. During operation of the feedwater pump 10, the heat pump 4 is also driven. When the feedwater pump 10 is stopped, the heat pump 4 is also stopped. However, as described above, the rotational speed of the feedwater pump 10 in operation is controlled by the inverter such that the temperature detected by the water temperature sensor 22 is desirably maintained. Note that, when the temperature of the water in the heat source water tank 6 is high, the feedwater pump 10 may be driven in the state where the heat pump 4 is stopped, to recover waste heat. Further, the heat pump 4 is switched between the driven state and the stopped state depending on whether or not its compressor 13 is in operation.

When the heat pump 4 is driven to supply feedwater from the makeup water tank 5 to the feedwater tank 3 via the feedwater path 8, the feedwater from the makeup water tank 5 is gradually heated by the waste heat recovery heat exchanger 12, the supercooler 17, and the condenser 14, and supplied to the feedwater tank 3 at a predetermined temperature. As compared to the case where feedwater is circulated between the feedwater tank 3 and the heat pump 4 (the condenser 14), the feedwater is heated during a single passage (once-through) from the makeup water tank 5 to the feedwater tank 3. Accordingly, the temperature difference in the feedwater before and after passing through the heat pump 4 can be secured. Thus, the coefficient of performance (COP) of the heat pump 4 can be improved. Further, each heat exchanger can be structured in a compact manner.

With the structure of the present embodiment, as compared to the conventional system. 1 (the system in which the waste heat recovery heat exchanger 12 and the supercooler 17 are not included and in which feedwater is circulated between the feedwater tank 3 and the heat pump 4), the system efficiency of 8 to 9 or more can be achieved. Thus, it becomes possible to largely contribute toward saving energy or reducing carbon dioxide emission.

Meanwhile, depending on the temperature of feedwater from the makeup water tank 5 or the temperature of heat source water from the evaporator 16, the feedwater cannot be heated at the waste heat recovery heat exchanger 12, and it is rather cooled in some cases. Accordingly, as a preparation to such cases, as represented by a chain double-dashed line in FIG. 1, a bypass path 26 is connected to the heat source supply path 20 at the points upstream and downstream from the waste heat recovery heat exchanger 12. Then, a three way valve 27 or the like should be provided at the branching point between the heat source supply path 20 leading to the waste heat recovery heat exchanger 12 and the bypass path 26, such that the heat source water from the evaporator 16 can be switched between the course to be passed through the waste heat recovery heat exchanger 12 and the course to be discharged via the bypass path 26 without involvement of the waste heat recovery heat exchanger 12. Then, as a result of monitoring a temperature T1 of the feedwater on the entrance side of the waste heat recovery heat exchanger 12 and a temperature T2 of the heat source water on the exit side of the evaporator 16, when the temperature T1 of the feedwater is lower than the temperature T2 of the heat source water (T1<T2), the heat source water having passed through the evaporator 16 is allowed to pass through the waste heat recovery heat exchanger 12. On the other hand, when the temperature T1 of the feedwater is higher than the temperature T2 of the heat source water (T1≥T2), the heat source water having passed through the evaporator 16 should be allowed to pass through the bypass path 26 without involvement of the waste heat recovery heat exchanger 12.

While the heat pump 4 is driving, that is, while feedwater is supplied to the feedwater tank 3 via the feedwater path 8, the temperature of heat source water in the heat source water tank 6 may be monitored by the heat source temperature sensor 25, and the output of the heat pump 4 may be adjusted based on the temperature. As the temperature of the heat source water as the heat source of the heat pump 4 is higher, the output of the heat pump 4 can be reduced. By adjusting the output of the heat pump 4 taking into consideration of the temperature of the heat source water, the flow rate of the feedwater supplied to the feedwater tank 3 via the feedwater path 8 can be stabilized irrespective of changes in the temperature of the heat source water.

Further, while the heat pump 4 is driving, if the water level of the heat source water tank 6 becomes low and the low water level detecting electrode rod 24 stops sensing the water level, then the heat pump 4 should be stopped from driving. At the same time, the heat source supply pump 21 should be stopped from supplying heat source water to the evaporator 16. Thus, the heat pump 4 can be prevented from being driven unnecessarily. Further, similarly, while the heat pump 4 is driving (that is, while control is exerted to perform the supply of the feedwater to the feedwater tank 3 via the feedwater path 8), in the event that the amount of the feedwater passing through the feedwater path 8 becomes lower than the set value, the heat pump 4 should be stopped from driving. At the same time, the heat source supply pump 21 should be stopped from supplying heat source water to the evaporator 16.

The feedwater heating system 1 of the present invention can be changed as appropriate without being limited to the structure of the embodiment. In particular, structures and control other than the following can be changed as appropriate: supply of the feedwater to the feedwater tank 3 via the feedwater path 8 is performed such that the feedwater is passed through the waste heat recovery heat exchanger 12, the supercooler 17, and the condenser 14 in sequence, and the heat source fluid of the heat pump 4 is passed through the evaporator 16 and the waste heat recovery heat exchanger 12 in sequence; and preferably, during the supply of the feedwater to the feedwater tank 3 via the feedwater path 8, the heat pump 4 is driven and the amount of the feedwater supplied to the condenser 14 (the amount of the feedwater supplied to the feedwater tank 3 via the feedwater path 8) is adjusted such that the temperature of the feedwater on the exit side of the condenser 14 is maintained at the set temperature.

In the embodiment, the feedwater pump 10 is controlled by the inverter in order to adjust the flow rate of the feedwater supplied to the feedwater tank 3 via the feedwater path 8. However, the opening degree of the valve provided on the feedwater path 8 may be adjusted while the feedwater pump 10 is controlled to turn ON/OFF. That is, the method for adjusting the flow rate of the feedwater supplied via the feedwater path 8 can be changed as appropriate, so long as the flow rate of the feedwater can be adjusted based on the temperature detected by the water temperature sensor 22.

Further, the heat pump 4 is not limited to have a single-stage structure and may have a multiple-stage structure. In the case where the heat pump 4 of the multiple-stage structure is employed, the heat pumps of adjacent stages may be connected to each other using an indirect heat exchanger, or may be connected using a direct heat exchanger (an intermediate cooler). In the latter case, an intermediate cooler that receives a refrigerant from a compressor of a lower-stage heat pump and a refrigerant from an expansion valve of a higher-stage heat pump and that brings the refrigerants into contact with each other to perform heat exchange is included. This intermediate cooler functions as the condenser for the lower-stage heat pump and also functions as the evaporator for the upper-stage heat pump. The heat pump 4 of a plural-stage (multiple-stage) structure includes a heat pump having a single-source and multiple-stage structure as described above. In addition, the heat pump 4 of a plural-stage (multiple-stage) structure includes a heat pump having a plural-way (multiple-way) structure, and a heat pump having a combination of the foregoing structures.

Further, the specific structure of the feedwater path 8 and that of the makeup water path 9 are not limited to those of the embodiment and can be changed as appropriate, so long as the feedwater can be supplied to the feedwater tank 3 through the feedwater path 8 via the condenser 14, and also can be supplied through the makeup water path 9 without involvement of the condenser 14. For example, in the embodiment, the feedwater path 8 and the makeup water path 9 are provided in parallel such that each of the feedwater path 8 and the makeup water path 9 connects between the makeup water tank 5 and the feedwater tank 3. However, one of or both of one end portions (the end portions on the side of the makeup water tank 5) and other end portions (the end portions on the side of the feedwater tank 3) of the feedwater path 8 and the makeup water path 9 may be shared. In other words, one end portion of the makeup water path 9 may be provided so as to branch from the feedwater path 8 instead of being connected to the makeup water tank 5, and other end portion of the makeup water path 9 may be provided so as to merge with the feedwater path 8 upstream from the feedwater tank 3 instead of being connected to the feedwater tank 3. When one end portion of the makeup water path 9 is provided so as to branch from the feedwater path 8 instead of being connected to the makeup water tank 5, the feedwater pump 10 should be provided on the feedwater path 8 downstream from the branching point and the makeup water pump 11 should be provided on the makeup water path 9. Note that, it is also possible to provide the pump only to the shared path upstream from the branching point, and to adjust the flow rate of the feedwater in the feedwater path 8 and the makeup water path 9 by adjusting the opening degree of valve (s) provided on the feedwater path 8 and/or the makeup water path 9 downstream from the branching point.

Still further, in the embodiment, the makeup water tank 5 is provided for storing feedwater to be supplied to the feedwater tank 3. However, in some cases, the makeup water tank 5 can be dispensed with, and water may be directly supplied from the feedwater source to the feedwater path 8 and the makeup water path 9.

Still further, in the embodiment, feedwater can be supplied from the makeup water tank 5 to the feedwater tank 3 via the feedwater path 8 and/or the makeup water path 9. However, the feedwater may be directly supplied from the water softener. For example, in FIG. 1, the base end portion of the feedwater path 8 and that of the makeup water path 9 may be integrally connected to the water softener. Then, the opening degree of a motor-operated valve (motor valve) that is provided on the feedwater path 8 instead of the feedwater pump 10 is adjusted. Further, opening and closing operations of a solenoid valve that is provided on the makeup water path 9 instead of the makeup water pump 11 should be controlled.

Still further, in the embodiment, though the description has been given of the system in which feedwater to be supplied to the feedwater tank 3 of the boiler 2 can be heated by the heat pump 4, use of the feedwater stored in the feedwater tank 3 is not limited to the boiler 2 and can be changed as appropriate. Then, depending on the situation, the makeup water tank 5 or the makeup water path 9 can be dispensed with.

Still further, in the embodiment, though the description has been given of use of heat source water as the heat source of the heat pump 4, the heat source fluid of the heat pump 4 is not limited to the heat source water. A variety of fluids including air and exhaust gas can be used. However, it is preferable to employ a heat source fluid that provides heat (sensible heat) to the refrigerant of the heat pump 4 at the evaporator 16, thereby lowering the temperature of the fluid itself, and that thereafter provides heat (sensible heat) to the feedwater at the waste heat recovery heat exchanger 12, thereby lowering the temperature of the fluid itself.

REFERENCE SIGNS LIST 1 feedwater heating system
2 boiler
3 feedwater tank
4 heat pump
5 makeup water tank
6 heat source water tank
7 pump
8 feedwater path
9 makeup water path
10 feedwater pump
11 makeup water pump
12 waste heat recovery heat exchanger
13 compressor
14 condenser
15 expansion valve
16 evaporator
17 supercooler
18 supply path
19 overflow path
20 heat source supply path
21 heat source supply pump
22 water temperature sensor
23 water level detector
24 low water level detecting electrode rod
25 heat source temperature sensor
26 bypass path
27 three way valve

The invention claimed is:

1. A feedwater heating system comprising:
a heat pump in which a compressor, a condenser, an expansion valve, and an evaporator are connected in sequence in an annular manner to allow a refrigerant to circulate, the heat pump drawing heat from a heat source fluid that passes through the evaporator, the heat pump heating feedwater that passes through the condenser; and
a feedwater tank that can be supplied with the feedwater from a feedwater path through which the feedwater passes through a waste heat recovery heat exchanger, a supercooler, and the condenser in sequence,
wherein the waste heat recovery heat exchanger is an indirect heat exchanger between the feedwater supplied to the feedwater tank via the feedwater path and the heat source fluid, the waste heat recovery heat exchanger being configured to perform indirect heat exchange between the feedwater which is in a state prior to being supplied to the supercooler and the heat source fluid which has passed through the evaporator of the heat pump, wherein the supercooler is an indirect heat exchanger between the feedwater supplied to the feedwater tank via the feedwater path and the refrigerant, the supercooler being configured to perform indirect heat exchange between the feedwater which is in a state subsequent to passing through the waste heat recovery heat exchanger and prior to being supplied to the condenser and the refrigerant which is supplied from the condenser to the expansion valve, and wherein the condenser of the heat pump is an indirect heat exchanger between the feedwater supplied to the feedwater tank via the feedwater path and the refrigerant, the condenser being configured to perform indirect heat exchange between the feedwater which has passed through the supercooler and the refrigerant which is supplied to the supercooler from the compressor.

2. The feedwater heating system according to claim 1, wherein while the feedwater tank is supplied with the feedwater via the feedwater path, the heat pump is driven and an amount of the feedwater being passed through the condenser is adjusted such that a temperature of the feedwater on an exit side of the condenser of the heat pump is maintained at a set temperature.

3. The feedwater heating system according to claim 1, wherein the condenser condenses the refrigerant of the heat pump, such that the feedwater to be supplied to the feedwater tank is heated by latent heat and sensible heat of the refrigerant of the heat pump, and wherein the supercooler cools a liquid refrigerant from the condenser, such that the feedwater to be supplied to the feedwater tank is heated by the sensible heat of the refrigerant of the heat pump.

4. The feedwater heating system according to claim 1, wherein whether or not the heat source fluid having passed through the evaporator is passed through the waste heat recovery heat exchanger is switchable, and wherein the heat source fluid having passed through the evaporator is not passed through the waste heat recovery heat exchanger when a temperature of the feedwater on an entrance side of the waste heat recovery heat exchanger is higher than a temperature of the heat source fluid on an exit side of the evaporator.

5. The feedwater heating system according to claim 1, wherein an output of the heat pump is adjusted based on a temperature of the heat source fluid that is passed through the evaporator of the heat pump.

6. The feedwater heating system according to claim 1, wherein the heat pump is stopped from driving and supply of the heat source fluid to the evaporator is stopped when an amount of the heat source fluid that is passed through the evaporator of the heat pump becomes lower than a set value or when an amount of the feedwater that passes through the feedwater path becomes lower than a set value.

7. The feedwater heating system according to claim 2, wherein the condenser condenses the refrigerant of the heat pump, such that the feedwater to be supplied to the feedwater tank is heated by latent heat and sensible heat of the refrigerant of the heat pump, and wherein the supercooler cools a liquid refrigerant from the condenser, such that the feedwater to be supplied to the feedwater tank is heated by the sensible heat of the refrigerant of the heat pump.

8. The feedwater heating system according to claim 2, wherein whether or not the heat source fluid having passed through the evaporator is passed through the waste heat recovery heat exchanger is switchable, and wherein the heat source fluid having passed through the evaporator is not passed through the waste heat recovery heat exchanger when a temperature of the feedwater on an entrance side of the waste heat recovery heat exchanger is higher than a temperature of the heat source fluid on an exit side of the evaporator.

9. The feedwater heating system according to claim 3, wherein whether or not the heat source fluid having passed through the evaporator is passed through the waste heat recovery heat exchanger is switchable, and wherein the heat source fluid having passed through the evaporator is not passed through the waste heat recovery heat exchanger when a temperature of the feedwater on an entrance side of the waste heat recovery heat exchanger is higher than a temperature of the heat source fluid on an exit side of the evaporator.

10. The feedwater heating system according to claim 4, wherein whether or not the heat source fluid having passed through the evaporator is passed through the waste heat recovery heat exchanger is switchable, and wherein the heat source fluid having passed through the evaporator is not passed through the waste heat recovery heat exchanger when a temperature of the feedwater on an entrance side of the waste heat recovery heat exchanger is higher than a temperature of the heat source fluid on an exit side of the evaporator.

11. The feedwater heating system according to claim 2, wherein an output of the heat pump is adjusted based on a temperature of the heat source fluid that is passed through the evaporator of the heat pump.

12. The feedwater heating system according to claim 3, wherein an output of the heat pump is adjusted based on a temperature of the heat source fluid that is passed through the evaporator of the heat pump.

13. The feedwater heating system according to claim 4, wherein an output of the heat pump is adjusted based on a temperature of the heat source fluid that is passed through the evaporator of the heat pump.

14. The feedwater heating system according to claim 2, wherein the heat pump is stopped from driving and supply of the heat source fluid to the evaporator is stopped when an amount of the heat source fluid that is passed through the evaporator of the heat pump becomes lower than a set value or when an amount of the feedwater that passes through the feedwater path becomes lower than a set value.

15. The feedwater heating system according to claim 3, wherein the heat pump is stopped from driving and supply of the heat source fluid to the evaporator is stopped when an amount of the heat source fluid that is passed through the evaporator of the heat pump becomes lower than a set value or when an amount of the feedwater that passes through the feedwater path becomes lower than a set value.

16. The feedwater heating system according to claim 4, wherein the heat pump is stopped from driving and supply of the heat source fluid to the evaporator is stopped when an amount of the heat source fluid that is passed through the evaporator of the heat pump becomes lower than a set value or when an amount of the feedwater that passes through the feedwater path becomes lower than a set value.

* * * * *